United States Patent [19]

Kirchmayer

[11] Patent Number: 5,224,466
[45] Date of Patent: Jul. 6, 1993

[54] PROCESS FOR CONVERTING SOLAR ENERGY INTO HEAT AND DEVICE FOR IMPLEMENTING THE PROCESS

[76] Inventor: Leonhard Kirchmayer, Gabelsbergerstr. 77, 2.Rückgebäude II, W-8000 München 2, Fed. Rep. of Germany

[21] Appl. No.: 820,697

[22] PCT Filed: Jul. 30, 1990

[86] PCT No.: PCT/EP90/01243
§ 371 Date: Mar. 10, 1992
§ 102(e) Date: Mar. 10, 1992

[87] PCT Pub. No.: WO91/02199
PCT Pub. Date: Feb. 21, 1991

[30] Foreign Application Priority Data

Jul. 28, 1989 [DE] Fed. Rep. of Germany ....... 3925145

[51] Int. Cl.⁵ .............................................. F24J 2/00
[52] U.S. Cl. ................................. 126/714; 126/587; 126/597; 126/641; 126/643; 62/235.1
[58] Field of Search ............... 126/435, 422, 437, 419, 126/400; 237/2 B, 2 R; 62/235.1, 238.7, 238.6; 165/45, 48.2, 18

[56] References Cited

U.S. PATENT DOCUMENTS 4,251,997 2/1981 Newton ........................... 62/235.1
4,527,618 7/1985 Fyfe ................................. 237/2 B

FOREIGN PATENT DOCUMENTS 0033756 8/1981 European Pat. Off. .
0054729 6/1982 European Pat. Off. .
0092251 10/1983 European Pat. Off. .
2554975 6/1977 Fed. Rep. of Germany .
3001550A1 7/1981 Fed. Rep. of Germany .
2404181 4/1979 France .
2496847 6/1982 France .

Primary Examiner—James C. Yeung
Attorney, Agent, or Firm—Jacobson, Price, Holman & Stern

[57] ABSTRACT

A process and apparatus for converting solar energy into heat wherein a solar collector includes a plurality of mutually-coupled solar energy collector elements (1) coupled to a heat transfer fluid circuit, each collector element including a collector channel (3) located on the bottom of a collector chamber (37) delimited by a transparent cover, the collector chamber normally being connected to a high temperature reservoir (12) via connecting lines (10, 11), until a control valve arrangement (18) is reversed and the collector channel is disconnected from the high temperature reservoir and connected to a low temperature reservoir (13) for heat pump (26) operation when the temperature of the circulating heat transfer fluid falls below a predetermined minimum value detected by a temperature sensor (35) associated with the collector channel. The temperatures of the heat transfer fluid and the collector chamber are measured and compared to derive a temperature differential value used by a control device to control the control valve arrangement to control flow of heat transfer fluid in the operation.

12 Claims, 2 Drawing Sheets

PROCESS FOR CONVERTING SOLAR ENERGY INTO HEAT AND DEVICE FOR IMPLEMENTING THE PROCESS

BACKGROUND OF THE INVENTION

The invention relates to a process and apparatus for converting solar energy into heat by means of a solar collector consisting of a plurality of mutually coupled collector elements placed on the outside of a building or the like and connected to a heat transfer fluid network. More particularly each collector element includes a collector channel located at the bottom of a collector chamber delimited by a transparent cover, the collector channel being normally connected via a connecting line consisting of a forward branch and return branch to a high-temperature reservoir until a control valve arrangement is reversed and the collector channel is disconnected from the high-temperature reservoir and connected to a low-temperature reservoir for heat pump operation when the temperature of the circulating heat transfer fluid falls below a minimum value predetermined by the temperature in the high-temperature reservoir and measured by means of a temperature sensor associated with the collector channel.

An apparatus of this type is of relevance above all for electrical multivalent domestic-heat-control, with solar energy preferably being used, in which the solar collector is associated with an absorber facing away from the sun, thus forming a collector referred to as "hybrid collector" or "all-weather collector", respectively.

In a known process of this type, which makes use of the apparatus disclosed in European Patent Application 0,054,729, the heat transfer fluid to be found, when the collector channel is connected to the low-temperature reservoir, in the disconnected idle part of the line running to the high-temperature reservoir can cool down to the ambient temperature. As a consequence, with increasing sunshine and transition to high-temperature reservoir operation, first the comparatively cold heat transfer fluid flows into the high-temperature reservoir before the heated follow-on heat-transfer fluid exiting the collector channel which is exposed to the sunlight enters the high-temperature reservoir. On the other hand, since the high-temperature reservoir is connected to the heat transfer fluid network containing the pump and the collector channel, at cold weather there is a danger of thermosiphon circulation of the heat transfer fluid from the high-temperature reservoir to the collector channel where the heat is conveyed to the surrounding region.

Here it should be mentioned that in a process of a different class, wherein the energy is obtained exclusively with the aid of the collector channel of a solar collector and the heated heat transfer fluid is supplied by means of a circulation pump via a connecting line to a single reservoir, this circulation and thus the connection to the reservoir is disconnected if the temperature of the heat transfer fluid falls below a predetermined temperature as a result of decreasing sunlight. In this device, a heat valve, whose structure and function correspond to that of the radiator valve of a motor vehicle and which is connected to a short-circuit branch which short-circuits the reservoir, is provided for bridging the cycle running through the reservoir. Accordingly, the circulation pump pumps the heat transfer fluid only through the short-circuit branch. The reservoir is connected again to the cycle only when the heat valve effects the necessary switchover when the predetermined minimum temperature is reached. Such a heat valve switchover has considerable drawbacks. As long as the predetermined temperature has not yet been reached again, the operation of the circulation pump is practically futile. In this case either a timer control for switching on and, when necessary, switching off pump operation is necessary, or additional temperature sensors involving high expenditures have to be used in order to guarantee appropriate pump operation. Moreover, there exists a special drawback in that during times of particularly intensive sunlight the temperature in the reservoir can rise to a value which is considerably higher than the limiting value for disconnecting the bridging short-circuit branch. If the temperature of the entering heat transfer fluid drops to a value slightly above this limiting value, thermal heat fluid of a higher temperature is withdrawn from the reservoir and, instead, heat transfer fluid of a lower temperature is supplied. Thus, on the whole, the reservoir liquid cools down again in a most undesirable manner, without having been utilized for any useful purpose.

There is already known a solar collector device (German Patent DE 3,001,550 A1) in which a low temperature reservoir and a high-temperature reservoir are provided, which are selectively connected to the solar collector in such a manner that the high-temperature reservoir is linked to the solar collector only if there is a growing integral of the measured temperature as well as a positive difference between the temperatures in the solar collector forward-branch and the high-temperature reservoir. If, however, this temperature is not sufficient, a connection to the low-temperature reservoir is carried through. During this operating mode, no switchover to high-temperature reservoir operation is possible, even if the temperature in the forward branch permitted admission to the high-temperature reservoir. If on high-temperature reservoir operation the temperature required for high-temperature reservoir operation drops below the minimum value, a switchover to low-temperature reservoir operation takes place. An automatic switchover to high temperature reservoir operation, if permitted by the irradiation conditions on low temperature reservoir operation, is however not provided, and thus there is no need for heating up the heat transfer fluid having the low-temperature reservoir operation temperature through short-circuit operation before the switchover to high-temperature reservoir operation takes place. In this known design, also first a short-circuit operation during a predetermined delay time takes place after connection, i.e. the collector more or less heats up, for a certain period of time, the heat transfer fluid in the forward/return lines, which has cooled down after the device had been stopped, to a temperature above the temperature of the high-temperature reservoir; the latter is connected to the collector only after expiration of this period.

Further, it has been disclosed in the prior art (German Patent DE 2,554,975 A1) to take the difference between the temperature in the collector chamber and that of the heat transfer fluid, that is, however, the temperature of the fluid entering the collector from the return branch, as a basis for controlling solar collector devices.

Moreover, it is known (European Patent document EP 0,033,756 A1) to use the temperatures of the heat transfer fluid at the inlet and at the outlet of the reservoir, rather than at the inlet and at the outlet of the collector channel, for controlling the reversing valve between a heat reservoir and a collector.

Now it has turned out that a fixed, predetermined temperature differential value that represents an optimum value for operating conditions usually given during certain times of the year may be more or less inappropriate for operating conditions during other times of the year. For intensive irradiation in summer, a small temperature differential value is sufficient; is selecting the same value for operation in winter, however, it often turns out when opening the short circuit branch that the temperature differential value required for transition to high-temperature reservoir operation where the short-circuit branch is closed again is not reached. As a consequence thereof, in this case a switchover to low-temperature reservoir operation is carried through.

In order to appropriately effect a switch over, i.e., an opening of the short-circuit branch, only if in all likelihood a switchover to high-temperature reservoir operation can again take place afterwards, it is advisable to define the predetermined temperature differential value according to specific fixed criteria. In this connection its has proven to be advantageous if the predetermined temperature differential value for reversing the control valve arrangement by opening the short-circuit branch is selected in dependence on the difference in the temperatures of the heat transfer fluid in the high-temperature reservoir and in the low-temperature reservoir.

Experience shows that in winter the difference between the fluid temperature in the high-temperature reservoir and the fluid temperature in the low-temperature reservoir is considerably larger than in summer. Accordingly, the predetermined winter temperature differential value relevant for switchover is higher than the value predetermined for summer.

BRIEF SUMMARY OF THE INVENTION

An object of the invention is to provide a solar energy apparatus and process adopting the steps of including the low-temperature reservoir in the cycle until the temperature conditions permit to switch over to high-temperature reservoir operation, and switching back to low-temperature reservoir operation as soon as the temperature conditions no longer permit high-temperature reservoir operation, in such a manner that the comparatively cold fluid is prevented from detrimentally entering the high-temperature reservoir when a switchover from low-temperature reservoir operation to high-temperature reservoir operation is carried through.

The process according to the invention which solves this problem is characterized by the following steps:

(a) measuring the temperature of the heat transfer fluid in the collector channel as well as the temperature in the collector chamber, (b) comparing the measured heat transfer fluid temperature with the temperature in the collector chamber in order to derive a first temperature differential value, (c) using this first temperature differential value for reversing the control valve arrangement associated with a short-circuit branch between the forward branch and the return branch so that the short-circuit branch is temporarily opened as soon as the first temperature differential value has reached a predetermined value.

(d) measuring the temperature of the heat transfer fluid in the collector channel as well as the temperature of the heat transfer fluid in the high-temperature reservoir, (e) comparing the heat transfer fluid temperatures measured in the collector channel on the one hand and in the high-temperature reservoir on the other hand in order to derive a second temperature differential value, and (f) using the second temperature differential value for reversing the control valve arrangement so that the short-circuit branch is closed but the connection to the high-temperature reservoir is opened as soon as the second temperature differential value has reached a predetermined value.

In this way, any intake of cold heat transfer fluid into the high-temperature reservoir directly after switching over to high-temperature reservoir operation is effectively prevented, and it is rather ensured that the heat transfer fluid first is guided in the cycle through the collector channel and the short-circuit branch until such time as it has reached a specific temperature, whereupon the short-circuit branch is closed again and, instead, the cycle through the high-temperature reservoir is opened by reversing the control valve arrangement If, subsequently, the temperature of the circulating heat transfer fluid, when exiting the collector channel, drops to a temperature below the temperature of the heat transfer fluid in the high-temperature reservoir, the control valve arrangement is reversed again, i. e. the high-temperature reservoir is disconnected and, instead, the low-temperature reservoir is switched in.

An alternative solution of the above problem by the invention is characterized by the following steps:

(a) measuring the temperatures of the heat transfer fluid at the inlet and at the outlet of the collector channel, (b) comparing the measured heat transfer fluid temperature at the outlet with the heat transfer fluid temperature at the inlet in order to derive a first temperature differential value, (c) using the first temperature differential value for reversing the control valve arrangement associated with a short-circuit branch between the forward branch and the return branch so that the short-circuit branch is temporarily opened as soon as the first temperature differential value has reached a predetermined value, (d) measuring the temperature of the heat transfer fluid at the outlet of the collector channel as well as the temperature of the heat transfer fluid in the high-temperature reservoir, (e) comparing the heat transfer fluid temperatures measured in the collector channel on the one hand and in the high-temperature reservoir on the other hand in order to derive a second temperature differential value, and (f) using the second temperature differential value for reversing the control valve arrangement so that the short-circuit branch is closed but the connection to the high-temperature reservoir is opened as soon as the temperature differential value has reached a predetermined value.

Also in this invention it is assured that the heat transfer fluid circulates through the collector channel until it has reached a specific temperature and can be supplied to the high-temperature reservoir, without any danger of the heat transfer fluid cooling down in the high-temperature reservoir.

In addition, the disconnection of the high-temperature reservoir from the heat transfer fluid network containing the pump and the collector channel ensures that no thermosiphon circulation of the heat transfer fluid from the high-temperature reservoir to the collector channel occurs in cold weather which would result in heat being withdrawn from the reservoir and conveyed to the surrounding region. This would be highly detrimental in particular if the high-temperature reservoir can also be operated by means of an oil burner in order to guarantee a minimum temperature during the cold time of the year.

In order to guarantee circulation of the heat transfer fluid in the heat transfer fluid network, in the simplest case a pump of a certain output is switched in. It has proven to be of great advantage if, according to another development of the invention, a pump with an adjustable output is employed which is controlled in case of switchover from short circuit branch operation to high-temperature reservoir operation according to the respective temperature differential value of the heat transfer fluid temperatures measured in the high-temperature reservoir on the one hand and the collector channel on the other hand. If the temperature differential value lessens, for example as a result of a sudden decrease in irradiation, the output is reduced and the heat transfer fluid flows more slowly through the network and thus the collector. Only if it turns out that no sufficiently high rise in temperature is achieved even during a slow flow through the collector channel, a switchover to low-temperature reservoir operation is effected when a minimum temperature differential value of, say, 6° C. is not reached.

The apparatus of the invention for implementing the process includes a solar collector consisting of a plurality of collector elements which can be placed on the outside of a building or the like, mutually coupled, and connected to a heat transfer fluid network, each of the collector elements being provided with a collector channel located in a plane facing the sun, at the bottom of a collector chamber delimited by a transparent cover, which collector channel can be disconnected in its normal operating position in which it is connected to a high-temperature reservoir via a connecting line consisting of a forward branch and return branch, respectively, from the high-temperature reservoir by means of a control valve arrangement when the temperature of the circulating heat transfer fluid falls below a predetermined minimum value detected by a temperature sensor associated with the collector channel and which can be connected to a low-temperature reservoir, as well as being provided, if required, with an absorber channel located in a plane oriented perpendicularly to the collector channel, which is in contact with the surrounding air and is connected via a second connecting line containing a pump to the low-temperature reservoir which is connected to the high-temperature reservoir via a heat pump. The device according to the invention is characterized in that the absorber channel is associated with a temperature sensor and that both the collector element with the collector channel and the high-temperature reservoir as well as the low-temperature reservoir are associated with temperature sensors which like the control valve arrangement, are connected to a control device comprising a reference circuit, and that a short-circuit branch disconnecting both the low-temperature reservoir and the high-temperature reservoir and directly connecting the forward branch and backward branch, respectively, to each other is included in the collector channel connecting line, the heat transfer fluid being circulated through said short-circuit branch when the control valve arrangement is reversed from low temperature reservoir operation to high-temperature reservoir operation until such time as it has reached, in the collector channel, the higher temperature required for being supplied to the high-temperature reservoir, with a temperature sensor also connected with the control device and detecting the temperature in the collector chamber being provided apart from the temperature sensor detecting the temperature of the heat transfer fluid in the collector channel, the temperature sensor triggering the switchover from low-temperature reservoir operation to the short-circuit branch circulation preceding the high-temperature reservoir operation via the control device when the temperature in the collector chamber rises to a predetermined value relative to the temperature in the collector channel.

BRIEF DESCRIPTION OF THE DRAWINGS

Additional features, advantages and details will be apparent from the following description with reference to the accompanying drawing wherein.

DETAILED DESCRIPTION

Figure 1:
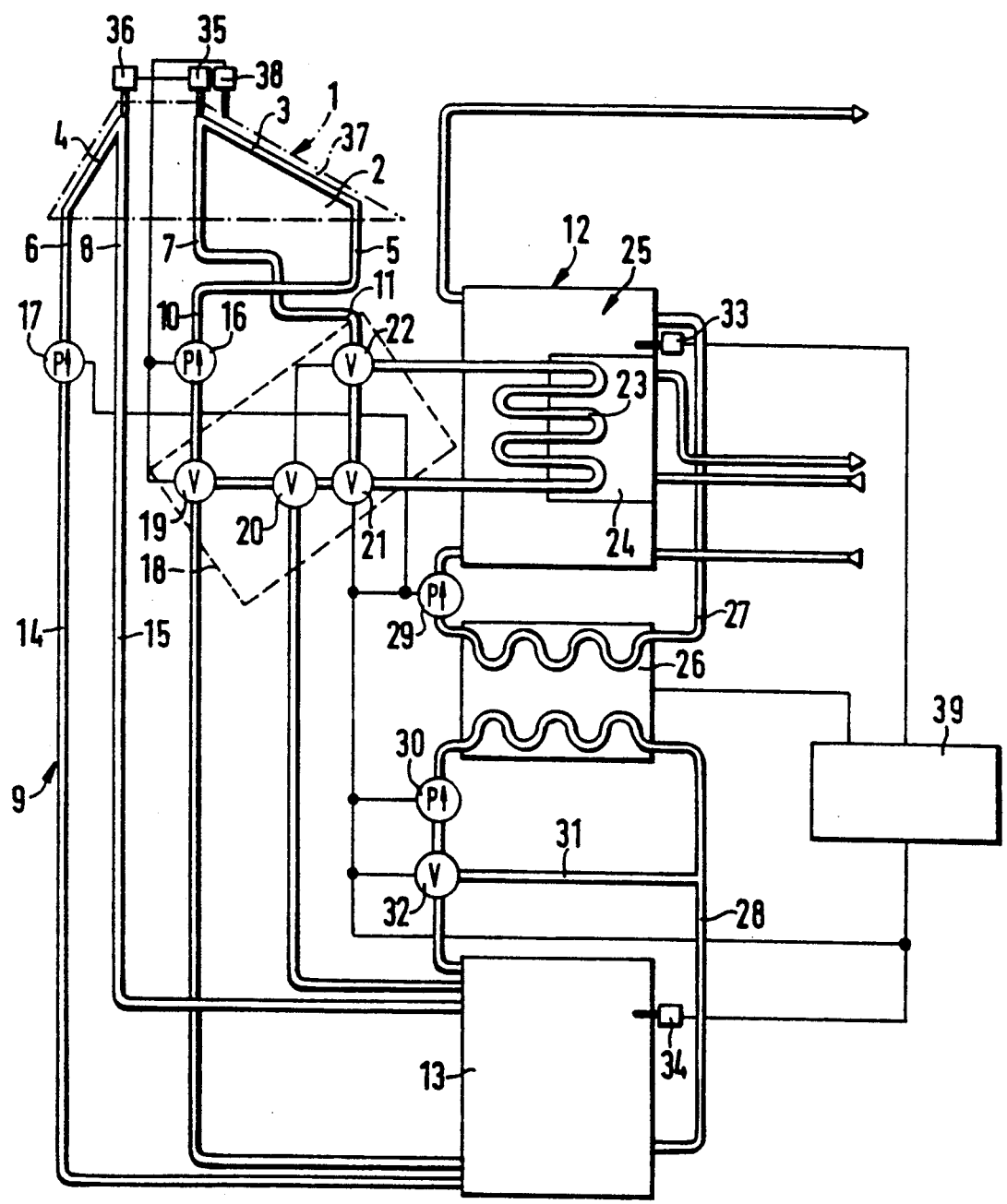
FIG. 1 is a schematic fluid circuit diagram showing the solar energy device of the invention.

The apparatus for converting solar energy into heat includes a solar collector illustrated in the drawings only schematically, which consists of a plurality of collector elements 1 fixed on the outside of a building or the like. These collector elements may be of known principle structure, i. e. having an insulating body 2 with inclined surfaces enclosing a roughly right angle relative to each other. The surface facing the sun is associated with a collector channel 3, whereas the surface extending perpendicularly thereto is associated with an absorber channel 4. Each of the two channels 3, 4 has one inlet tube 5 and 6, respectively, and one outlet tube 7 and 8, respectively, by which each collector element 1 can be coupled to an adjacent collector element of the same type or connected to a heat transfer fluid network 9, respectively. The latter comprises a first connecting line consisting of a forward branch 10 and a return branch 11 by which the collector channel 3 can be connected either to a high-temperature reservoir 12 or to a low-temperature reservoir 13. The absorber channel 4 is connected via a second connecting line consisting of a second forward branch 14 and a second return branch 15 to the low-temperature reservoir 13. Both the first connecting line 10, 11 and the second connecting line 14, 15 include a pump 16 and 17, respectively, for guaranteeing circulation of the heat transfer fluid.

The first connecting line 10, 11 include a valve arrangement 18 consisting in the exemplary embodiment of FIG. 1 of four electromagnetically actuatable two-way valves 19, 20, 21, 22. By means of the two-way valve 19 the forward branch 10 can be connected to the high-temperature reservoir 12 or the low-temperature reservoir 13, respectively. In this configuration, the two-way valves 20 and 21 are connected in series in the path running to the high-temperature reservoir 12, and a branch leading from the latter valve to the two-way valve 22 is disconnected. In case of reversal, the two-way valves 20, 21 and 22 enable a connection of the low-temperature reservoir 13 to the return branch 11. In such case, the high-temperature reservoir 12 is bridged over, or by-passed, by the connecting branch between the valves 21 and 22. When the high-temperature reservoir 12 is connected via the forward and return branches 5, 7 to the collector channel 3, the transferred heat is conveyed by means of a heat exchanger 23 either to the water destined for domestic use in the boiler 24 or to the heating water outside the boiler 24 in the room 25.

Between the low-temperature reservoir 13 and the high-temperature reservoir 12 is connected a heat pump 26. In each of the two cycles 27, 28 between the reservoirs 12, 13 and the heat pump 26, there are connected circulation pumps 29, 30. On the side of the low-temperature reservoir, the heat pump 26 can be bridged, or by-passed, over by a short-circuit line 31 having a valve 32 which can continuously be controlled to be open. The high-temperature reservoir 12 and the low-temperature reservoir 13 are each connected with a temperature sensor 33, 34. The temperature prevailing in the collector channel 3 is detected by a temperature sensor 35, and the temperature prevailing in the absorber channel 4 is detected by a temperature sensor 36. The collector channel 3 is located in known fashion not shown in detail in the drawing below a transparent cover at the bottom of a collector chamber 37 which is delimited by the cover. To detect the temperature in this collector chamber 37, an additional temperature sensor 38 is provided.

As indicated by light lines, all temperature sensors 33 to 36 and 38 are connected to a control device 39 having comparator circuits that compare the measured values. Analogously, both the pumps 16, 17 as well as 29 and 30, and the two-way valves 19 to 22 and the control valve 32 are connected to the control device 39 by which control of the elements in question is effected.

If in case of low-temperature reservoir operation the temperature sensor 38 detects a sufficiently large difference in temperature relative to the temperature detected by the temperature sensor 35, then the two-way valves 19, 20 are reversed so that the pump 16 pumps the heat transfer fluid in a short-circuit cycle through the two-way valves 19 to 22. During this operating mode, the temperature measured by the temperature sensor 35 rises. As soon as the control device 39 determines, on the basis of the measured temperature values transmitted to it, that a specific positive difference in temperature as compared to the temperature of the heat transfer fluid in the high-temperature reservoir 12 as detected by the temperature sensor 33 has been reached, it causes the two-way valves 21, 22 to be reversed. The heat transfer fluid heated in the collector channel 3 then flows under the action of the pump 16 through the two-way valve 22, the heat exchanger 23 of the high-temperature reservoir 12 and the two-way valves 21, 20 and 19.

If the difference between the temperatures detected by the temperature sensors 35 and 33 falls below a specific value, the two-way valves 19 to 22 are reversed such that the valves 19 and 20 become disconnected from each other and the heat transfer fluid flows past the high-temperature reservoir 12 and through the low-temperature reservoir 13.

Before a switchover to high-temperature reservoir operation is carried through again in the course of gradual heating, first of all again short-circuit cycle operation takes place where both the low-temperature reservoir 13 and the high-temperature reservoir 12 are bridged over (by-passed).

Instead of using the temperature sensor 38 shown in the drawing in connection with the temperature sensor 35, it is also possible to detect the growing degree of heating resulting from the increasing radiated energy, as well as utilizing it, in a different manner. For example, instead of the temperature sensor 38 provided in the collector chamber 37, a temperature-sensor arrangement may be provided both at the inlet and at the outlet of the collector channel, measuring the temperatures that prevail there and are evaluated in the control device. In this case, the measured difference in temperature is compared with a predetermined value in order to obtain a comparative value. When a comparative value of a predetermined magnitude is reached, the control device triggers reversal of the control valve arrangement, so that the short-circuit branch is opened. Also in this case the difference between the temperature of the heat transfer fluid at the outlet of the collector channel and the temperature of the heat transfer fluid in the high-temperature reservoir is used for determining the time of disconnecting the short-circuit branch and simultaneously including the high-temperature reservoir in the cycle.

Figure 2:
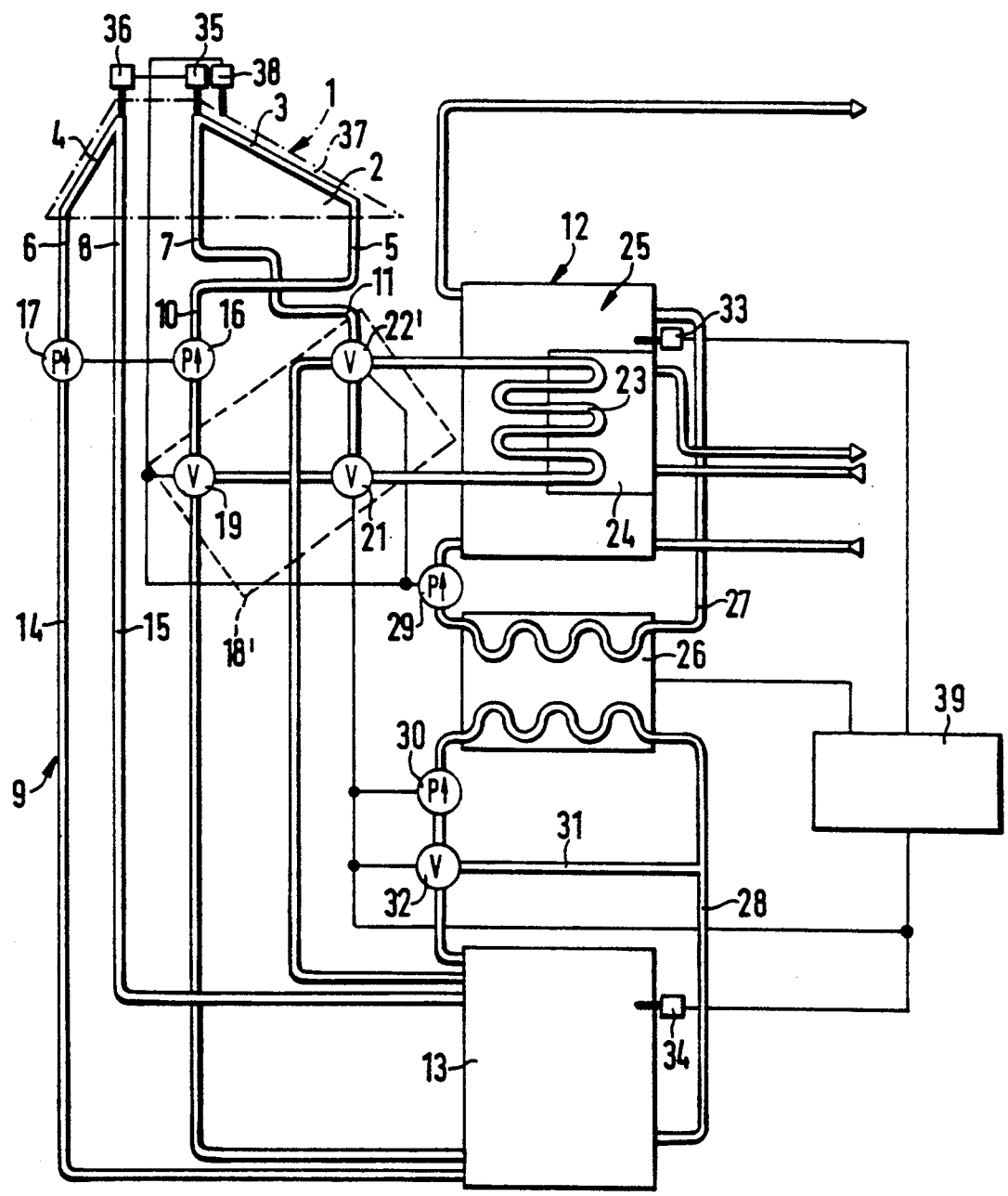
FIG. 2 is a view similar to FIG. 1 showing a different embodiment of the invention.

Instead of the valve arrangement 18 shown in FIG. 1 having four two-way valves, according to FIG. 2 also a valve arrangement 18' comprising the two two-way valves 19, 21 and a three-way valve 22' which can also be reversed electromagnetically by means of the control device 39 can be employed. By means of said three-way valve 22', the cycle may run either through the low-temperature reservoir 13 or through the high-temperature reservoir 12 or, as a third possibility, first through the two-way valve 21 to the two-way valve 19 in a direct manner, that is, also in short-circuit operation, until the control device 39 by evaluating the values measured by the individual temperature sensors triggers, in the above-described manner, the switchover to high-temperature reservoir operation.

The above explanations deal with the advantages connected with the temporary opening of the short-circuit branch on transition from low-temperature reservoir operation to high-temperature reservoir operation. In contrast to that, it may be advantageous, if the irradiation intensity decreases only for a short time e. g. as a consequence of sudden clouding-over, to also first open the short-circuit branch temporarily prior to transition from high-temperature reservoir operation to low-temperature reservoir operation. In this case, the irradiation intensity can increase again during the temporary opening of the short-circuit branch, with the result that within a relatively short period of time the difference between the temperature in the high-temperature reservoir and the temperature in the collector channel becomes sufficiently large again for triggering the switchover to high-temperature reservoir operation. This proceeding lies within the scope of the invention, too.

The processes outlined in the description of the figures each are based on two measured temperature values, namely the measured temperature of the heat transfer fluid in the collector channel, on the outlet side, and the temperature in the collector chamber or, instead, the temperature on the inlet side of the collector channel. In case of low-temperature reservoir operation, the supply of relatively cold brine involves a cooling of the air to be found in the collector chamber 37. Thus, the temperature value measured by the temperature sensor 38 does not correspond to the radiated energy but is falsified by the cooling of the air. Therefore, it has proven to be of great advantage if the temperature sensor 38 is inserted such that it is insulated from the directly adjoining area, i. e. insulated thermally, in the collector chamber 37. Since this temperature sensor practically measures the temperature which would exist if no circulation of the heat transfer fluid was effective, a "stopping temperature" is thus detected, i.e. the temperature which would exist if there was no flow through the collector channel. Thereby there is provided the possibility of directly taking the temperature value measured by means of the temperature sensor 38 being installed in heat-insulating manner as a basis for transition from low-temperature reservoir operation to high-temperature reservoir operation for the purposes of switching over to temporary short-circuit branch operation, i. e. to only detect this temperature. However, a switchover to high-temperature reservoir operation is effected only when the values measured by the temperature sensors 35 and 33 indicate that the conditions necessary therefor are given, namely that a difference in temperature of, for example, 6° C. is reached. The high-temperature reservoir operation is maintained until such time as this value is no longer reached, whereupon the switchover takes place again, as described above.

Analogously, instead of detecting the light irradiation effect, i. e. the effect of radiated energy, by measuring the temperature, also the irradiation intensity itself may be determined, for instance by means of a photosensor associated with the collector elements 1, and used as a basis for the pump control and valve arrangement control, respectively, by means of the control device 39. Here it has to be taken into account on the side of the control device by connecting delay elements or integrating circuit-elements, respectively, that the photosensor reacts very quickly on any change in the irradiation intensity, so that the values measured by it cannot be compared with those delivered by the temperature sensors 35 and 38. It is rather necessary, for instance, to detect and integratingly evaluate a plurality of measured values obtained in the course of a certain period of time, in order to calculate on the basis thereof a value simulating the inertia, on which value the control then is based.

I claim:

1. A process for converting solar energy into heat by a solar collector including a plurality of mutually coupled collector elements disposed in a position to receive solar rays and connected to a heat transfer fluid circuit, each collector element having a collector channel located at the bottom of a collector chamber, a transparent cover over said chamber, a high temperature reservoir, a low temperature reservoir, a first forward conduit and a first return conduit connecting said collector channel to said high temperature reservoir and low temperature reservoir, first control valve means connected to said first forward and first return conduits for controlling flow of said heat transfer fluid alternatively to said high temperature reservoir and said low temperature reservoir for heat pump operation when the temperature of said heat transfer fluid in said collector channel falls below a minimum value predetermined by the temperature in said high temperature reservoir, and a temperature sensor for detecting the temperature in said collector channel, the process for carrying out a transition from a low temperature reservoir operation to a high temperature reservoir operation comprising in order:

measuring the temperature of said heat transfer fluid in said collector channel;

measuring the temperature in said collector chamber;

comparing the measured heat transfer fluid temperature in said collector channel with the measured temperature in said collector chamber and deriving a first temperature differential value therefrom;

when said first temperature differential value has reached a predetermined value, controlling said control valve means for bypassing heat transfer fluid flow around said high temperature reservoir;

measuring the temperature of said heat transfer fluid in said collector channel;

measuring the temperature of said heat transfer fluid in said high temperature reservoir;

comparing the last measured heat transfer fluid temperatures in said collector channel and in said high temperature reservoir and deriving therefrom a second temperature differential value; and when said second temperature differential value has reached a second predetermined value, controlling said control valve means for closing said bypass and opening said conduits between said high temperature reservoir and said collector channel for flowing said heat transfer fluid between said high temperature reservoir and said collector channel.

2. The process as claimed in claim 1 and further comprising:

providing an adjustable output fluid pump for pumping said heat transfer fluid through said heat transfer conduit; and pumping said heat transfer fluid by controlling said pump when said bypass is closed in response to said second temperature differential valve.

3. A process for converting solar energy into heat by a solar collector including a plurality of mutually coupled collector elements disposed in a position to receive solar rays and connected to a heat transfer fluid circuit, each collector element having a collector channel located at the bottom of a collector chamber, a transparent cover over said chamber, a high temperature reservoir, a low temperature reservoir, a first forward conduit and a first return conduit connecting said connector channel to said high temperature reservoir and low temperature reservoir, first control valve means connected to said first forward and first return conduits for controlling flow of said heat transfer fluid alternatively to said high temperature reservoir and said low temperature reservoir for heat pump operation when the temperature of said heat transfer fluid in said collector channel falls below a minimum value predetermined by the temperature in said high temperature reservoir, and a temperature sensor for detecting the temperature in said collector channel, the process for carrying out a transition from a low temperature reservoir operation to a high temperature reservoir operation comprising in order:

measuring the temperature of said heat transfer fluid at an inlet to said collector channel;

measuring the temperature of said heat transfer fluid at an outlet of said collector channel;

comparing the measured heat transfer fluid temperatures at said inlet and said outlet of said collector channel and deriving therefrom a first temperature differential value;

when said first temperature differential value has reached a predetermined value, controlling the control valve means for bypassing the flow of heat transfer fluid around said high temperature reservoir and through a bypass conduit between said first forward conduit and first return conduit;

measuring the temperature of said heat transfer fluid at said outlet of said collector channel;

measuring the temperature of said heat transfer fluid in said high temperature reservoir;

comparing the heat transfer fluid temperatures last measured at said outlet of said collector channel and in said high temperature reservoir and deriving therefrom a second temperature differential value; and when said second temperature differential value has reached a second predetermined value, controlling said control valve means for closing said bypass conduit and connecting said high temperature reservoir to said collector channel for flow of said heat transfer fluid therebetween through said first forward conduit and said first return conduit.

4. The process as claimed in claim 3 and further comprising:

providing an adjustable output fluid pump for pumping said heat transfer fluid through said heat transfer circuit; and pumping said heat transfer fluid by controlling said pump when said bypass is closed in response to said second temperature differential valve.

5. A process for converting solar energy into heat by a solar collector including a plurality of mutually coupled collector elements disposed in a position to receive solar rays and connected to a heat transfer fluid circuit, each collector element having a collector channel located at the bottom of a collector chamber, a transparent cover over said chamber, a high temperature reservoir, a low temperature reservoir, a first forward conduit and a first return conduit connecting said connector channel to said high temperature reservoir and low temperature reservoir, first control valve means connected to said first forward and first return conduits for controlling flow of said heat transfer fluid alternatively to said high temperature reservoir and said low temperature reservoir for heat pump operation when the temperature of said heat transfer fluid in said collector channel falls below a minimum value predetermined by the temperature in said high temperature reservoir, and a temperature sensor for detecting the temperature in said collector channel, the process for carrying out a transition from a low temperature reservoir operation to a high temperature reservoir operation comprising in order:

measuring the temperature of said heat transfer fluid in said high temperature reservoir;

measuring the temperature in said low temperature reservoir;

comparing the measured heat transfer fluid temperature in said high temperature reservoir with the measured temperature in said low temperature reservoir and deriving a first temperature differential value therefrom;

when said first temperature differential value has reached a predetermined value, controlling said control valve means for bypassing heat transfer fluid flow around said high temperature reservoir;

measuring the temperature of said heat transfer fluid in said collector channel;

measuring the temperature of said heat transfer fluid in said high temperature reservoir;

comparing the last measured heat transfer fluid temperatures in said collector channel and in said high temperature reservoir and deriving therefrom a second temperature differential value; and when said second temperature differential value has reached a second predetermined value, controlling said control valve means for closing said bypass and opening said conduits between said high temperature reservoir and said collector channel for flowing said heat transfer fluid between said high temperature reservoir and said collector channel.

6. The process as claimed in claim 5 and further comprising:

providing an adjustable output fluid pump for pumping said heat transfer through said heat transfer circuit; and pumping said heat transfer fluid by controlling said pump when said bypass is closed in response to said second temperature differential valve.

7. A process for converting solar energy into heat by a solar collector including a plurality of mutually coupled collector elements disposed in a position to receive solar rays and connected to a heat transfer fluid circuit, each collector element having a collector channel located at the bottom of a collector chamber, a transparent cover over said chamber, a high temperature reservoir, a low temperature reservoir, a first forward conduit and a first return conduit connecting said connector channel to said high temperature reservoir and low temperature reservoir, first control valve means connected to said first forward and first return conduits for controlling flow of said heat transfer fluid alternatively to said high temperature reservoir and said low temperature reservoir for heat pump operation when the temperature of said heat transfer fluid in said collector channel falls below a minimum value predetermined by the temperature in said high temperature reservoir, and a temperature sensor for detecting the temperature in said collector channel, the process for carrying out a transition from a low temperature reservoir operation to a high temperature reservoir operation comprising:

measuring the temperature of said heat transfer fluid in said high temperature reservoir;

measuring the temperature of said heat transfer fluid in said low temperature reservoir;

comparing the measured heat transfer fluid temperatures and deriving therefrom a first temperature differential value;

when said first temperature differential value has reached a predetermined value, controlling said control valve means for bypassing the flow of said heat transfer fluid around said high temperature reservoir and through a bypass conduit between said first forward conduit and first return conduit;

measuring the temperature of said heat transfer fluid at said outlet of said collector channel;

measuring the temperature of said heat transfer fluid in said high temperature reservoir;

comparing the heat transfer fluid temperatures measured at said outlet of said collector channel and in said high temperature reservoir and deriving therefrom a second temperature differential value; and when said second temperature differential value has reached a second predetermined value, controlling said control valve means for closing said bypass conduit and connecting said high temperature reservoir to said collector channel for flow of said heat transfer fluid therebetween through said first forward conduit and said first return conduit.

8. The process as claimed in claim 7 and further comprising:
providing an adjustable output fluid pump for pumping said heat transfer fluid through said heat transfer circuit; and
pumping said heat transfer fluid by controlling said pump when said bypass is closed in response to said second temperature differential valve.

9. A solar collector apparatus for converting solar energy into heat comprising:
at least one collector element adapted for installation in a position to receive solar rays;
a transparent cover on said collector element defining a collector chamber in said collector element having a bottom portion;
a collector channel in said collector chamber disposed substantially in a plane facing the sun;
a high temperature reservoir;
a low temperature reservoir;
a heat pump means connecting said low temperature reservoir with said high temperature reservoir;
a heat transfer fluid flow conduit means connected between said collector channel and said high temperature reservoir and said low temperature reservoir for flow of said heat transfer fluid between said collector channel and said high temperature reservoir, and alternatively between said collector channel and said low temperature reservoir, comprising a forward branch connected to an inlet of said collector channel and a return branch connected to an outlet of said collector channel;
control valve means operatively connected with said forward branch and said return branch for controlling flow of said heat transfer fluid in said branches between said high temperature reservoir and said collector channel and alternatively between said low temperature reservoir and said collector channel, and for bypassing flow of said heat transfer fluid alternatively around said high and low temperature reservoirs;
a first temperature sensor operatively connected with said collector channel for sensing the temperature in said collector channel;
a second temperature sensor operatively connected in said high temperature reservoir for sensing the temperature in said high temperature reservoir;
pump means in said fluid circuit for pumping said heat transfer fluid through said fluid circuit; and
control means operatively connected to said temperature sensors and said control valve means and comprising a reference circuit;
said collector channel being connected to said high temperature reservoir in the normal operating position when the temperature of said heat transfer fluid in said collector channel sensed by said first temperature sensor is less than a predetermined minimum value;
said control means receiving temperatures measured by said temperature sensors and in response thereto comparing the temperature in said collector channel with the temperature in said high temperature reservoir and deriving a first temperature differential value therefrom, when said first temperature differential value has reached a first predetermined value operating said control valve means for bypassing said high temperature reservoir and said low temperature reservoir, measuring the temperature of said heat transfer fluid in said collector channel and in said high temperature reservoir, comparing said heat transfer fluid temperatures measured in said collector channel and said high temperature reservoir and deriving a second temperature differential value therefrom, and when said second temperature differential value has reached a second predetermined value, operating said control valve means for closing said bypass around said high temperature reservoir and connecting said forward branch and return branch between said high temperature reservoir and said collector channel for flow of said heat transfer fluid therebetween.

10. The apparatus as claimed in claim 9 and further comprising:
a third temperature sensor operatively connected to said collector chamber for detecting the temperature in said collector chamber and operatively connected with said control means;
said control means determining when the temperature in said collector chamber is raised to a third predetermined value relative to the temperature in said collector channel and in response thereto operates said control valve means to bypass the flow of said heat transfer fluid around said low temperature reservoir prior to operating said control valve means to control flow of said heat transfer fluid between said high temperature reservoir and said collector channel.

11. The apparatus as claimed in claim 9 and further comprising:
a fourth temperature sensor operatively connected with an inlet of said collector channel;
a fifth outlet temperature sensor operatively connected with an outlet of said collector channel;
said fourth and fifth temperature sensors being operatively connected to said control means, so that said control means detects the difference between temperatures sensed by said fourth and fifth temperature sensors and in response thereto operates said control valve means for opening said bypass.

12. The apparatus as claimed in claim 9 and further comprising:
an absorber channel in said collector element disposed in a plane oriented substantially perpendicularly to said plane of said collector channel, said absorber channel being in contact with ambient air;
absorber channel conduits comprising a second forward branch connected between said low temperature reservoir and an inlet to said absorber channel, and a second return branch connected between said low temperature reservoir and an outlet to said absorber channel; and
a pump inserted in said second forward branch of said absorber channel conduits for pumping heat transfer fluid between said absorber channel and said low temperature reservoir through said second forward branch and said second return branch.

* * * * *